United States Patent [19]

Farooque et al.

[11] Patent Number: 5,110,692
[45] Date of Patent: May 5, 1992

[54] GASKET FOR MOLTEN CARBONATE FUEL CELL

[75] Inventors: Mohammad Farooque, Huntington; Jeff Allen, Woodbury, both of Conn.

[73] Assignee: Energy Research Corporation, Danbury, Conn.

[21] Appl. No.: 570,034

[22] Filed: Aug. 20, 1990

[51] Int. Cl.⁵ .............................................. H01M 8/04
[52] U.S. Cl. ............................................. 429/36; 429/38; 429/16; 29/623.2
[58] Field of Search .................. 429/14, 16, 18, 34, 429/35, 36, 38; 427/115; 29/623.1, 623.2

[56] References Cited

U.S. PATENT DOCUMENTS

| | | | |
|---|---|---|---|
| 4,591,538 | 5/1986 | Kunz | 429/16 |
| 4,643,954 | 2/1987 | Smith | 439/26 |
| 4,761,348 | 8/1988 | Kunz et al. | 429/35 |

*Primary Examiner*—Anthony Skapars
*Attorney, Agent, or Firm*—Robin, Blecker, Daley & Driscoll

[57] ABSTRACT

A gasket for a molten carbonate fuel cell formed of an elongated porous member able to support electrolyte flow and which includes barrier means for retarding such flow.

29 Claims, 1 Drawing Sheet

GASKET FOR MOLTEN CARBONATE FUEL CELL

BACKGROUND OF THE INVENTION

This invention relates to fuel cells and, in particular, to the prevention of electrolyte migration in these cells.

Fuel cells are well known in the art. These cells typically comprise porous anode and cathode electrodes which sandwich an electrolyte usually contained in a matrix. The electrode/matrix sandwich is situated between plates which define chambers for bringing fuel and oxidant process gases to the anode and cathode electrodes, respectively.

Cells formed in this manner are placed one on top of the other to form a fuel cell stack. The resultant fuel cell stack has end faces formed by the end faces of the individual cell components. These end faces communicate with manifolds which carry supply gases, both fuel and oxidant, to the stack as well as spent gases from the stack. To ensure gas-tight mating of the manifolds with the stack end faces, gaskets are typically interposed between the stack end faces and the manifold. These gaskets are usually porous.

In fuel cell stacks of the above type, it has been found that there is an undesirable migration of electrolyte through the stack. Thus, it has been found that the electrolyte from the individual cells migrates from the positive to negative end of the stack. This migration is driven by the stack voltage and causes the cells at the negative end of the stack to be flooded with electrolyte and the cells at the positive end of the stack to become depleted of electrolyte.

Such migration of electrolyte has been found to be most severe in fuel cell stacks employing molten carbonate fuel cells. In such stacks the migration can severely reduce stack performance and has been observed in stacks of far fewer cells than the several hundred cells contemplated for viable commercial power plants. Moreover, where the molten carbonate fuel cells employ a mixture of carbonates (e.g., $K_2CO_3$ and $Li_2CO_3$) as the electrolyte, there is a preferred movement of one of the carbonates (i.e., the $K_2CO_3$) to the negative end of the stack. This redistribution of the electrolyte further reduces stack performance.

It is known that the migration of electrolyte in fuel cell stacks is due to shunt currents which promote ionic electrolyte flow. These shunt currents are dependent upon the stack voltage and resistance to electrolyte flow. The latter resistance, in turn, is determined by the resistance of the cell weet seal and the resistance of the above-discussed manifold sealing gasket. These resistances act in series, with the resistance of the sealing gasket playing the dominant role and being rate controlling.

A variety of techniques have been proposed for counteracting the electrolyte migration problem. One proposed technique is disclosed in U.S. Pat. No. 4,591,438 and contemplates the use of a higher than usual content of $Li_2CO_3$ in the $Li_2CO_3/K_2CO_3$ electrolyte to maintain a uniform electrolyte molar ratio along the length of the stack. A second proposed technique is described in U.S. Pat. No. 4,643,954. In this technique, a passageway is provided for returning excess electrolyte from the negative end of the stack, where electrolyte flooding occurs, to the positive end of the stack, where electrolyte is depleted. Wicks are provided in the ends of this passageway to promote communication with the cell components and the end of the passageway where there is excess electrolyte is heated to increase the electrolyte vapor pressure.

A further attempt at a solution to the electrolyte migration problem is disclosed in U.S. Pat. No. 4,7613,348. In this patent, reservoirs are provided at the negative and positive ends of the stack for receiving excess electrolyte and supplying depleted electrolyte, respectively. These reservoirs are developed by forming the manifold gasket to have end portions of increased volume and cross-section The mid-portion of the gasket, in turn, is of lesser volume and cross-section and formed from a fiberous ceramic strip which acts to retard migration of electrolyte from the positive to negative end of the stack.

The above techniques have offered some limited solution to the electrolyte migration problem. However, is not believed that they can sufficiently reduce migration to bring it within tolerable limits. Furthermore, the techniques are cumbersome and not easily implemented.

It is therefore an object of the present invention to provide an improved apparatus and method for reducing the electrolyte migration in fuel cells.

It is yet a further object of the present invention to provide a manifold gasket for molten carbonate fuel cells which is adapted to reduce electrolyte migration.

It is yet a further object of the present invention to provide a gasket of the type described in the previous objective which can be easily and readily implemented.

SUMMARY OF THE INVENTION

In accordance with the principles of the present invention, the above and other objectives are realized by providing a fuel cell gasket apparatus and method in which a fuel cell gasket is formed from an elongated porous member able to support electrolyte flow and into which a barrier means is disposed for retarding such flow.

In the present illustrative case, the barrier means comprises a thin solid member or sheet which retards the flow of electrolyte ions through the elongated porous member. The thin sheet extends through the thickness of the elongated member and is affixed thereto. A number of such barrier means may be distributed along the length of the elongated member.

Various embodiments of barrier means joined to the adjoining sections of the elongated member are disclosed.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
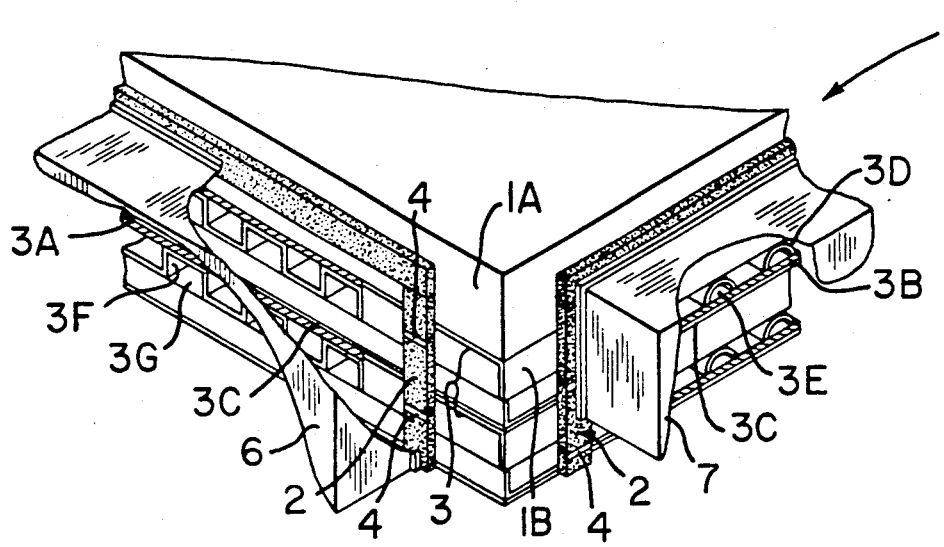
FIG. 1 shows a portion of a fuel cell stack incorporating a gasket apparatus in accordance with the principles of the present invention.

FIG. 1 shows a fuel cell stack 1 utilizing a gasket 2 in accordance with the principles of the present invention. The stack 1 comprises a plurality of fuel cells 3 each of which is comprised of number of components in sandwich arrangement.

More particularly, each fuel cell 3 includes a porous anode electrode 3A and a porous cathode electrode 3B between which are arranged a matrix 3C containing an electrolyte. In the present case, it is assumed that the electrolyte is a molten carbonate electrolyte and, therefore, that each cell 3 is a molten carbonate fuel cell.

A top separator plate 3D abuts the cathode electrode 3B and includes passages 3E for conveying oxidant process gas to the cathode electrode. A bottom separator plate 3F, in turn, abuts the anode electrode 3A and includes channels 3G for carrying fuel process gas to the anode electrode.

As can be seen, the fuel cells 3 are placed one on top of the other to form the fuel cell stack 1. With this configuration, the stack 1 has end faces formed by the end edges of the components making up the individual cells, two such end faces 1A and 1B being visible. In usual practice, manifolds 6, 7 (partially shown in FIG. 1) faced with a dielectric member are placed against these end faces in order to supply the fuel and oxidant process gases to the separator plate channels. Similar manifolds with dielectric faces are placed against the oppositely disposed end faces of the extract spent gases from these channels. In order to ensure a gas-tight relationship between the manifolds and the adjoining stack end faces, the gaskets 2 are provided.

The gaskets 2 are made from a material which is sufficiently porous to enable the gaskets to elastically conform to the uneven surfaces of the respective manifolds and stack end faces, thereby maintaining the desired gas-tight seal. Typical materials for the gaskets 2 might be zirconia oxide, alumina, ceramic felt or a cloth material.

As can be appreciated and as is seen in FIG. 1, the gaskets 2 when placed against their respective stack end faces come in contact with the end edges of the fuel cell matrices 3C. As a result, the electrolyte in these matrices is made available to the gaskets 2 and, as above-indicated, during operation of the stack, the gaskets 2 enable electrolyte to flow or migrate through the gasket pores from the positive to negative end of the stack 1 driven by the stack voltage. As also above-indicated, such electrolyte flow is ionic in character and is due to shunt currents through the gasket. If the migration is allowed to occur, it can result in electrolyte flooding of the cells at the negative end of the stack and electrolyte depletion in the cells at the positive end of the stack. These effects, in turn, if sufficiently severe can cause stack failure.

In accordance with principles of the present invention, in order to retard this flow, the gaskets 2 are provided in their interiors with one or more barriers 4. The barriers 4 are adapted to inhibit flow of electrolyte ions through the gasket body and thereby provide the desired electrolyte flow retardation.

As shown, the barriers 4 are thin, sheet or foil-like members. A thickness of a few mils or less for barriers 4 is acceptable and the barriers can be made of non-metallic or metallic materials. Typical, metallic materials might be gold or high temperature alloys such as Kanthal, Fe-Cr-Al-Y alloy or inconnel, or ceramics such as alumina.

If the metallic material used for the barriers 4 is conductive, care has to be taken to prevent each barrier from shorting across cell components of opposite polarity voltage. This can be accomplished by controlling the alignment of the gasket 2 or the actual physical configuration of the barriers, so that each barrier contacts only a single cell component. Alternatively, the metallic material used for the barriers 4 may be made non-conductive by, for example, using an alumina coating.

The barrier members 4 may be situated in the gasket 2 at predetermined levels depending upon the degree of retardation desired. Thus, the barriers 4 may be disposed at levels to span a predetermined number of cells 3, if only a partial reduction of electrolyte migration to a satisfactory level is desired. However, if substantially total blockage is desired, the barriers may be disposed so that a barrier is situated between each pair of cells 3.

Figure 2:
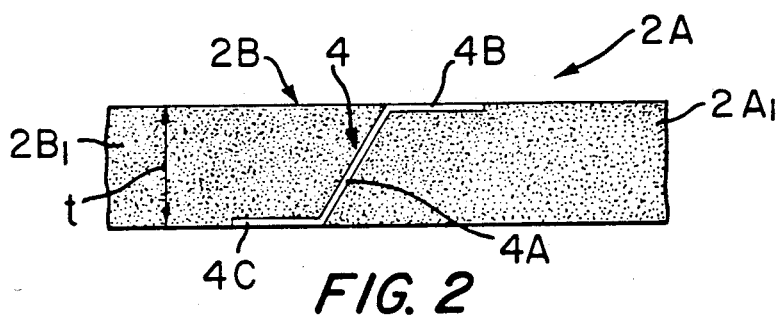
FIGS. 2-4 illustrate various embodiments of the gasket apparatus of FIG. 1.
Figure 3:
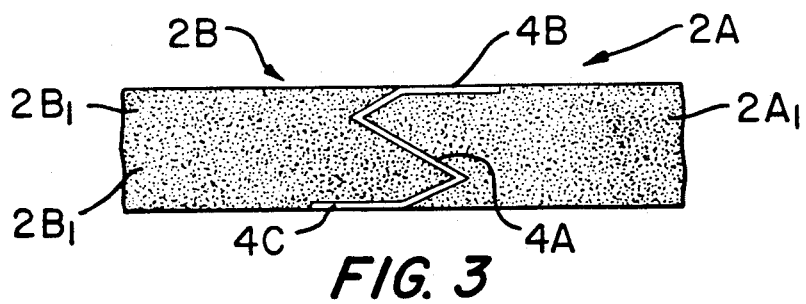
Figure 4:
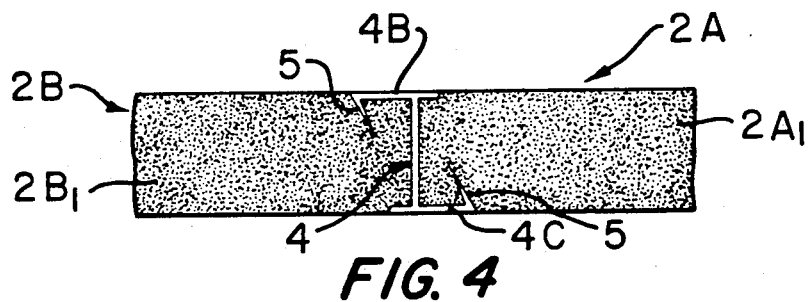

FIGS. 2–5 show various configurations for realizing the gasket 2 with interposed barriers 4. In FIGS. 2–4, gasket sections and interposed barrier members are joined together to achieve a full length gasket. Only two gasket sections 2A, 2B and an interposed barrier 4 are actually shown in each figure. By joining further barriers to the ends of each gasket section 2A, 2B and then joining further gasket sections to the other ends of these further barriers and repeating the process, gaskets of any desired length can be realized.

In FIGS. 2–4, each gasket section 2A, 2B comprises a gasket layer shown as layers $2A_1$ and $2B_1$, respectively. These layers are comprised of a porous material.

In FIG. 2, the barrier member 4 is in the form of a thin sheet having a flat central section 4A which extends through the thickness t of the gasket layers and which is at angle or slant with respect to the thickness dimension. The barrier 4 also comprises two end sections 4B and 4C which extend along the respective upper surface of the layer $2A_1$ and the lower surface of the layer $2B_1$, respectively. In this embodiment, the faces of the barrier sections are joined to the abutting surfaces of the gasket layers by gluing. A suitable glue might be spray adhesive "Photo Mount" (catalog #6094; 3M, St. Paul, Minn.).

The gasket configuration in FIG. 3 is similar to that in FIG. 2 and also utilizes glue to join the faces of th barrier sections and adjoining surfaces of the gasket layers. In this case, however, the central section 4A of the gasket 4 is corrugated so as to form oppositely directed V-shaped sub-sections. One V-shaped sub-section engages or joins the upper surface of gasket layer $2A_1$ and the other V-shaped sub-section the lower surface of gasket layer $2B_1$. The presence of the corrugations reduces slipping and thus provides a more effective joining of the gasket layers and barrier sections.

In FIG. 4, the end sections 4B, 4C of the barrier member 4A are provided with hooked ends 5 which protrude into the respective adjacent gasket layers $2B_1$, $2A_1$. These hooked ends thus mechanically lock the barrier member 4 to the gasket layers. If desired, with this configuration, gluing of the barrier sections to the layers may be dispensed with.

It should be noted that if a conductive metallic material is used to form the barriers 4, each barrier may be further configured to act as a fuse which opens in the event the barrier contacts opposite polarity cell components. In this way, any short circuit would be automatically corrected for by the barrier itself.

In all cases, it is understood that the above-identified arrangements ar merely illustrative of the many possible specific embodiments which represent applications of the present invention. Numerous and varied other arrangements can readily be devised in accordance with the principles of the present invention without departing from the spirit and scope of the invention.

What is claim is:

1. A gasket for use in a stack of fuel cells, the gasket being disposable along the length of the face of the stack of cells and being accessible to the cell electrolyte, the gasket comprising:
an elongated porous member able to support electrolyte flow;
and one or more barrier means within said member for retarding said electrolyte flow.

2. A gasket in accordance with claim 1 wherein:
said electrolyte flow is comprised of flow of electrolyte ions.

3. A gasket in accordance with claim 1 wherein:
said gasket includes a plurality of said barrier means situated within said elongated porous member at positions spaced along the length of said member.

4. A gasket in accordance with claim 3 wherein:
said spacing of said barrier means is such that when said gasket is placed adjacent said stack of cells, there is a barrier means positioned every predetermined number of cells.

5. A gasket in accordance with claim 4 wherein:
said predetermined number is one.

6. A gasket in accordance with claim 1 wherein:
the sections of the elongated porous member adjoining the opposite sides of said barrier means are affixed to said barrier means.

7. A gasket in accordance with claim 6 further comprising:
an adhesive disposed between the sections of the elongated porous member and the sides of the barrier means.

8. A gasket in accordance with claim 6 wherein:
said barrier means includes means for mechanically engaging said sections of said elongated porous member.

9. A gasket in accordance with claim 1 wherein:
said barrier means comprises a thin member extending through the thickness of said elongated porous member.

10. A gasket in accordance with claim 9 wherein:
the thickness of said thin member in less than a few mils.

11. A gasket in accordance with claim 9 wherein:
said thin member includes: a central section within the thickness of said elongated porous member and first and second end sections which extend from the central section along opposing outer surfaces of said elongated porous member.

12. A gasket in accordance with claim 11 wherein:
said centrals section of said elongated porous member is flat and at an angle to the thickness dimension of said elongated porous member.

13. A gasket in accordance with claim 11 wherein:
said central section is configured to engage said elongated porous member.

14. A gasket in accordance with claim 13 wherein:
said central section is corrugated.

15. A gasket in accordance with claim 14 wherein:
said corrugated central section includes V-shaped corrugations extending in opposite directions.

16. A gasket in accordance with claim 11 wherein:
each of said first and second en sections includes a hooked end for engaging said elongated porous member.

17. A gasket in accordance with claim 1 wherein:
said barrier means comprises a non-porous material.

18. A gasket in accordance with claim 17 wherein:
said non-porous material is one of gold, a high temperature alloy, Kanthal, Fe-Cr-Al-Y alloy and inconnel.

19. A gasket in accordance with claim 17 wherein:
said non-porous material is one of conductive and non-conductive.

20. A gasket in accordance with claim 17 wherein:
said material is electrically non-conductive.

21. A gasket in accordance with claim 20 wherein:
the electrically non-conductive material is alumina coated metal or ceramic material.

22. Apparatus comprising:
one or more fuel cells arranged in a stack, each fuel cell comprising porous anode and cathode electrodes and an electrolyte disposed between said electrodes, said one or more fuel cells defining at least one end face for said stack;
a manifold adjoining said end face;
and an gasket situated between said manifold and said end face along at least a portion of the length of said end face, said gasket including: an elongated porous member able to support electrolyte flow; and one or more barrier means within said elongated porous member for retarding said electrolyte flow 23. Apparatus in accordance with claim 22 wherein:
said gasket includes a plurality of said barrier means situated within said elongated porous member at positions along the length thereof such that there is a barrier means every predetermined number of said cells.

24. Apparatus in accordance with claim 23 wherein:
said number of cells is one.

25. Apparatus in accordance with claim 22 wherein:
said electrolyte is a molten carbonate.

26. A method comprising:
providing one or more fuel cells, each fuel cell comprising porous anode and cathode electrodes and an electrolyte disposed between said electrodes;
arranging said one or more fuel cells in a stack, said one or more fuel cells defining at least one end face for said stack;
placing a manifold in adjoining relationship to said end face;
and situating a gasket between said manifold and said end face along at least a portion of the length of said end face, said gasket including: an elongated porous member able to support electrolyte flow; and one or more barrier means within said elongated porous member for retarding said electrolyte flow.

27. A method in accordance with claim 26 wherein:
said gasket includes a plurality of said barrier means situated within said elongated porous member at positions along the length thereof such that there is a barrier mean every predetermined number of said cells.

28. A method in accordance with claim 27 wherein:
said number of cells is one.

29. A method in accordance with claim 26 wherein:
said electrolyte is a molten carbonate.

* * * * *

UNITED STATES PATENT AND TRADEMARK OFFICE
CERTIFICATE OF CORRECTION

PATENT NO. : 5,110,692

DATED : May 5, 1992

INVENTOR(S) : Mohammad Farooque and Jeff Allen

It is certified that error appears in the above-identified patent and that said Letters Patent is hereby corrected as shown below:

Col. 1, line 50. Change "weet" to -- wet --

Col. 2, line 16. After "however," insert -- it --

Col. 2, line 67. After "of" insert -- a --

Col. 3, line 23. After "the" insert -- stack to --

Col. 3, line 61. Change "inconnel" to -- Inconel --

Col. 4, line 28. Change "t" to -- $\underline{t}$ --

Col. 5, line 51. Change "centrals" to -- central --

Col. 5, line 63. Change "en" to -- end --

Col. 6, line 5. Change "inconnel" to -- Inconel --

Col. 6, line 22. Change "an" to -- a --

Signed and Sealed this

Twentieth Day of July, 1993

Attest:

MICHAEL K. KIRK

Attesting Officer

Acting Commissioner of Patents and Trademarks